(12) United States Patent
Chun et al.

(10) Patent No.: US 10,416,971 B2
(45) Date of Patent: Sep. 17, 2019

(54) METHOD OF CREATING THE BALANCED PARSE TREE HAVING OPTIMIZED HEIGHT

(71) Applicant: TmaxData Co.,Ltd., Seongnam-si, Gyeonggi-do (KR)

(72) Inventors: Po Sung Chun, Seongnam-si (KR); Sung Hee Jung, Seongnam-si (KR)

(73) Assignee: TMAXDATA CO., LTD. (KR)

( * ) Notice: Subject to any disclaimer, the term of this patent is extended or adjusted under 35 U.S.C. 154(b) by 122 days.

(21) Appl. No.: 15/659,552

(22) Filed: Jul. 25, 2017

(65) Prior Publication Data

US 2018/0357052 A1    Dec. 13, 2018

(30) Foreign Application Priority Data

Jun. 12, 2017    (KR) .................. 10-2017-0073401

(51) Int. Cl.
*G06F 8/41*    (2018.01)
(52) U.S. Cl.
CPC .................. *G06F 8/427* (2013.01)
(58) Field of Classification Search
CPC .................................................. G06F 8/427
USPC ................................................. 717/143
See application file for complete search history.

(56) References Cited

U.S. PATENT DOCUMENTS 5,557,786 A      9/1996  Johnson, Jr.
5,966,686 A  * 10/1999  Heidorn ............. G06F 17/271
                                                                704/9
2014/0330835 A1* 11/2014  Boyer ................ G06F 17/2705
                                                                707/741

2015/0169657 A1*  6/2015  Pal .................... G06F 16/2246
                                                                707/797

FOREIGN PATENT DOCUMENTS

JP        2011-221656      11/2011
KR        1020140059821     5/2014
KR        10-2014-0059821  12/2015

OTHER PUBLICATIONS

Harper, Robin, "GE, explosive grammars and the lasting legacy of bad initialisation.", IEEE, 2010, 8pg. (Year: 2010).*

(Continued)

*Primary Examiner* — Ryan D. Coyer
(74) *Attorney, Agent, or Firm* — Umberg Zipser LLP

(57)    ABSTRACT

Provided is a computer program stored in a computer readable storage medium, which includes encoded commands, wherein when the computer program is executed by one or more processors of a computer system, the computer program allows the one or more processor to perform the following steps for generating a balanced parse tree having an optimized height, the steps including: receiving a token stream including at least one token—the token stream meets an associate law—; determining whether an n-ary parse tree is full—the n-ary parse tree includes at least one node and the at least one node each includes n or less child nodes; a first node generating operation of generating a node while increasing a height of the parse tree based on the token stream when the n-ary parse tree is full; and a second node generating operation of generating the node while maintaining the height of the parse tree based on the token stream when the n-ary parse tree is not full.

10 Claims, 9 Drawing Sheets

(56) References Cited

OTHER PUBLICATIONS

Wegman, Mark, "Parsing for Structural Editors (Extended Abstract)", IEEE, 1980, 8pg. (Year: 1980).*
Korean Office Action issued by Korean Patent Office dated Nov. 5, 2018 for Korean Application No. 10-2017-0073401; 8 pgs.
Sung-Hyuk Cha; International Journal of Applied Mathematics and Informatics; Issue 2, vol. 6, 2012 pp. 67-75 "On Complete and Size Balanced k-ary Tree Integer Sequences" Pace University, Department of Computer Science.

* cited by examiner (a)

(b)

(a)

(b)

METHOD OF CREATING THE BALANCED PARSE TREE HAVING OPTIMIZED HEIGHT

CROSS-REFERENCE TO RELATED APPLICATIONS

This application claims priority to and the benefit of Korean Patent Application No. 10-2017-0073401 filed in the Korean Intellectual Property Office on Jun. 12, 2017, the entire contents of which are incorporated herein by reference.

TECHNICAL FIELD

The present disclosure relates to a compiler, and more particularly, to a method of creating a parse tree during a compiler parsing process.

BACKGROUND ART

In order to perform a specific operation or describe an operation process for acquiring a desired result in a computer, a user needs to prepare and execute a program with a "programming language".

Before executing a program written in a computer language, the program to be executed needs be converted into a command defined in a computer system and in this case, a compiler performs a conversion process.

The compiler accepts the program to be executed and generates another type of program with the same purpose as an output. During such a process, the compiler may find an error of the accepted program and output a semantic error message.

The compiler checks which words are included in a source program. Herein, a semantic word is called a token. Consequently, the first operation to be performed to translate the source program into a object program is to identify which token is used in the source program. In the compiler, the identification is called lexical analysis.

Second, which component among components of a sentence these words fit into need to be checked. In other words, while viewing grammar, it is checked whether the tokens are grammatically correct and the compiler calls the checking syntax analysis. In the compiler, the checking is called syntax analysis.

The third operation is to check a semantic of the word, that is, perform semantic analysis. However, since a formal language does not have a semantic, a type is mainly checked in such a process. Code optimization for reducing an execution time of a code created by the semantic analysis or reducing a memory is performed and last, the object program is created by considering characteristics of an object machine.

There are many methods to describe a logical structure of the compiler, but the logical structure is mainly divided into a front end and a rear end to be described. The front end as an independent part of the object machine analyzes a source program regardless of the object machine and creates an intermediate code and the rear end as a part dependent on the object machine translates the intermediate code created at the front end into an object code for a specific machine.

In more detail, the compiler operates by each step (translating one representation of the source program to another representation of the source program in a computer) that translates the source program from one representation to another representation. A couple of steps in the compiler called a pass and one pass means that an output is generated by one scanning. Each step of the compiler is divided into two passes of the front end and the rear end, which results in a two-pass compiler.

The compiler usually uses a binary tree to represent a concatenated single operation that guarantees associate laws in a syntax analysis process. In this case, a tree may not be balanceably created and a skew problem occurs. The tree is referred to as a skewed tree. The skewed tree has a problem in that the skewed tree increases a stack memory usage and increases a compile time.

SUMMARY OF THE INVENTION

The present disclosure has been made in an effort to provide technical features for providing a balanced parse tree having an optimized height during a compiler parsing process.

An exemplary embodiment of the present disclosure provides a computer program stored in a computer readable storage medium, which includes encoded commands, wherein when the computer program is executed by one or more processors of a computer system, the computer program allows the one or more processor to perform the following steps for parsing, the steps including: receiving a token stream including at least one token; determining whether an n-ary parse tree is full—the n-ary parse tree includes at least one node and the at least one node each includes n or less child nodes—; a first node generating operation of generating a node while increasing a height of the parse tree based on the token stream when the n-ary parse tree is full; and a second node generating operation of generating a node while maintaining the height of the parse tree based on the token stream when the n-ary parse tree is not full.

Another exemplary embodiment of the present disclosure provides a parsing method which is performed by one or more processors of a computing device, including: receiving a token stream including at least one token; determining whether an n-ary parse tree is full—the n-ary parse tree includes at least one node and the node includes n or less child nodes—; a first node generating operation of generating a node while increasing a height of the parse tree based on the token stream when the n-ary parse tree is full; and a second node generating operation of generating a node while maintaining the height of the parse tree based on the token stream when the n-ary parse tree is not full.

Yet another exemplary embodiment of the present disclosure provides a computing device including: one or more processors; and a memory storing commands executable in the one or more processors, and the one or more processors may perform receiving a token stream including at least one token; determining whether an n-ary parse tree is full—the n-ary parse tree includes at least one node and the node includes n or less child nodes—; a first node generating operation of generating a node while increasing a height of the parse tree based on the token stream when the n-ary parse tree is full; and a second node generating operation of generating the node while maintaining the height of the parse tree based on the token stream when the n-ary parse tree is not full.

According to an exemplary embodiment of the present disclosure, a balanced parse tree having an optimized height, which is created by the present disclosure can reduce a usage of a stack memory and shorten a compile time during a compile parsing process.

BRIEF DESCRIPTION OF THE DRAWINGS

Various aspects are now described with reference to the drawings and like reference numerals are generally used to designate like elements. In the following exemplary embodiments, for a description purpose, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

DETAILED DESCRIPTION

Figure 1:
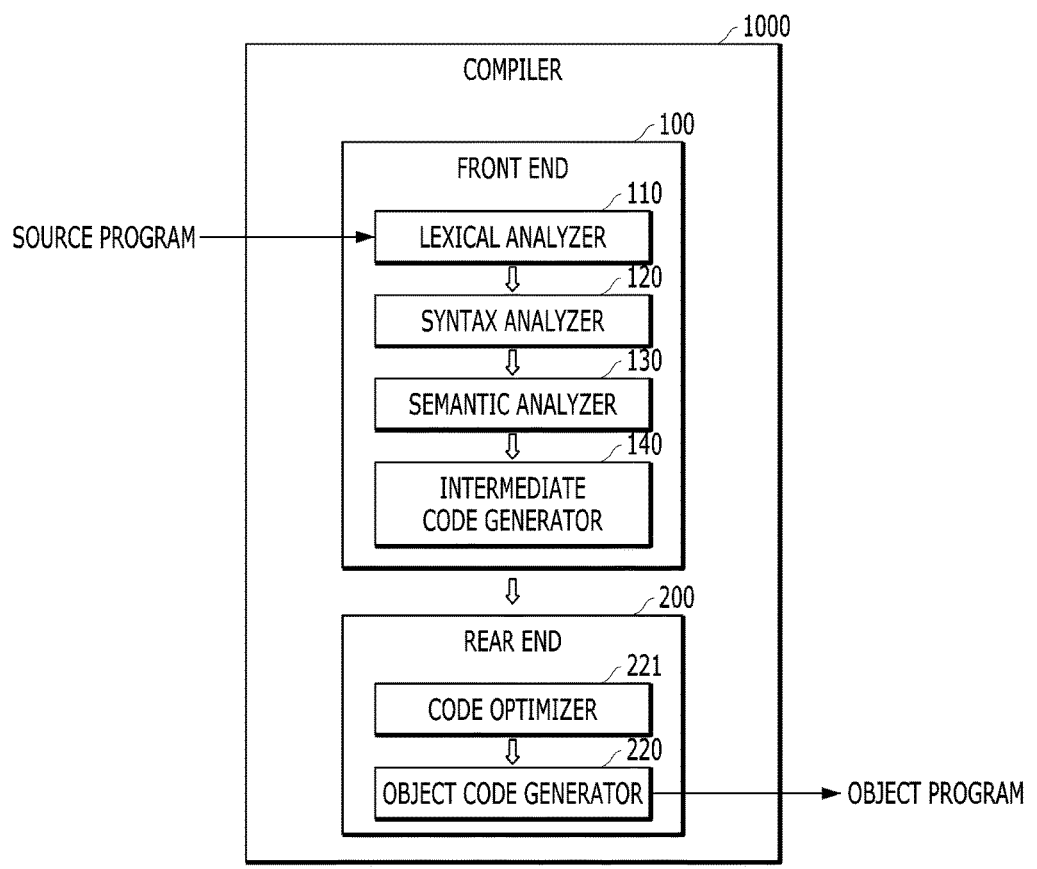
FIG. 1 is a diagram for describing a structure of an exemplary compiler according to an exemplary embodiment of the present disclosure.

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof.

Further various aspects and features will be presented by a system which can include multiple devices, components, and/or modules. It should also be appreciated and recognized that various systems can include additional apparatuses, components, and/or modules and/or that the various systems cannot include all of apparatuses, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, and the software.

The term "or" is intended to mean not exclusive "or" but inclusive "or". That is, when not separately specified or not clear in terms of a context, a sentence "X uses A or B" is intended to mean one of natural inclusive substitutions. That is, "X uses A or B" may be applied to all of the case where X uses A, the case where X uses B, and the case where X uses both A and B. Further, it should be understood that the term "and/or" used in the specification designates and includes all available combinations of one or more items among enumerated related items.

The word "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that a singular form generally means "one or more" in the present specification and the claims.

The computer-readable storage medium in the present specification may include all kinds of storage media storing programs and data so as to be readable by the computer system. According to an aspect of the present disclosure, the media may include a read only memory (ROM), a random access memory (RAM), a compact disk (CD)-ROM, a digital video disk (DVD)-ROM, a magnetic tape, a floppy disk, an optical data storage device, and the like. Additionally, the media are distributed to systems connected through network to store computer readable codes and/or commands in a distribution scheme.

Prior to describing detailed contents for carrying out the present disclosure, it should be noted that configurations not directly associated with the technical gist of the present disclosure are omitted without departing from the technical gist of the present disclosure. Further, terms or words used in the present specification and claims should be interpreted as meanings and concepts which match the technical spirit of the present disclosure based on a principle in which the inventor can define appropriate concepts of the terms in order to describe his/her invention by a best method.

FIG. 1 is a diagram for describing a structure of an exemplary compiler module 1000 according to an exemplary embodiment of the present disclosure.

A logical structure of the compiler module 1000 may be generally divided into a front end 100 and a rear end 200. In more detail, the logical structure of the compiler module 1000 may be divided into six units as illustrated in FIG. 1.

The front end 100 may include a lexical analyzer 110, a syntax analyzer 120, a semantic analyzer 130, and an intermediate code generator 140. The rear end 200 may include a code optimization unit 210 and an object code generation unit 220.

The front end 100 as an independent part from an object machine may analyze a source program and create an intermediate code regardless of the object machine. The rear end as a dependent part on the object machine may translate the intermediate code created at the front end into an object code for a specific machine.

Although not illustrated, a symbol table management unit and an error handler unit may interact with all of six units.

However, such a logical structure of the compiler is exemplary and according to the exemplary embodiment, some components may be omitted or new components may be added.

A first step of the compiler module 1000 is referred to as lexical analysis or scanning. In the lexical analysis, a source program is read and separated into a semantic grammatical unit called a token and a token stream is created. A tool that takes charge of the lexical analysis is referred to as the lexical analyzer 110 or a scanner.

A second step of the compiler module 1000 is referred to as syntax analysis or parsing. In this step, the token stream which is a result of the lexical analysis step is received to check whether the received token stream matches given grammar. In the case of a sentence which matches the given grammar, a parse tree for the sentence is output. In the case of an incorrect sentence, an error message is output. The tool that takes charge of the syntax analysis as described above is referred to as a syntax analyzer 120 or parser.

In general, the parse tree may include a token as a terminal node. The parse tree may be used as an input in an intermediate code generating step. In general, since the parse tree has a non-terminal symbol which is unnecessary information not used in a next step, the parse tree causes a memory space to be wasted and a compile time to be increased. Therefore, the unnecessary information may be removed in this step and a tree constituted by only imperatively necessary information may be created in a next step. The tree is referred to as an abstract syntax tree or simply referred to as a syntax tree.

A syntax tree is an abbreviated form of the parse tree having a structure in which an operator is represented in an internal node and an operand for the operator is represented in a child node of the operator.

A third step of the compiler module 1000 is referred to as semantic analysis. In this step, it is checked whether the source program semantically matches a language definition by using the syntax tree and information in the symbol table. In addition, in this step, data type information is collected and stored in the syntax tree or the symbol table in order to use the data type information for the intermediate code generation which is the next step. A tool that takes charge of such an operation is referred to as a semantic analyzer 130.

A fourth step of the compiler module 1000 is referred to as the intermediate code generation. In the intermediate code generation step, the intermediate code corresponding to each syntax is generated by using the syntax tree or syntax-directed translation is performed. The syntax-directed translation is to call, when a grammar rule is reduced, a code generation routine suitable for the rule to generate the intermediate code. A tool that takes charge of the intermediate code generation is referred to as an intermediate code generator 140.

A fifth step of the compiler is referred to as code optimization. In the code optimization step, a code which is semantically equivalent to a given input program and is more efficient is generated. Therefore, this step is a step for saving the memory space or an execution time when the code is executed. A tool that takes charge of the code optimization is referred to as a code optimizer 210.

A last step of the compiler is referred to as object code generation. In the object code generation step, a register which is to perform the operation is selected or a memory location of data is determined and a code suitable for the object machine is actually generated. A tool that takes charge of the object code generation is referred to as an object code generator 220.

The compiler module 1000 needs to include information on all data shown in the source program. For example, the compiler module 1000 needs to know whether a predetermined variable represents an integer or a real number, how large an array is, and how many parameters of a function are needed. Such information on the data is collected in the lexical and syntax analysis steps and stored in the symbol table.

When the compiler module 1000 finds an error in the source program, the compiler module 1000 needs to notify the error to a user. For example, an error in the grammar rule such as using characters that should not be used in the source program in the lexical analysis step or missing parentheses in the syntax analysis step may occur. The compiler module 1000 may have an error handling routine for handling such an error.

As a compiler used in a database server, an application compiler may check a syntax of a query, generate the parse tree, and generate the abstract syntax tree, and verify the syntax in response to receiving the query issued by a client. Herein, the query may include predetermined language expressions related to SQL used in application programs using languages including ESQL, PUSQL, etc., or application programs using C, C++, Java DB Client Library, etc.

As the compiler used in the database server, an SQL compiler may determine an optimized execution plan with respect to the received query based on hint information of a rewritten and converted query received according to a compiling operation, a query rewriting operation, and an execution code generating operation performed by the application compiler.

The present disclosure may be used even in the application compiler and the SQL compiler used in the database server.

In the compiler parsing process, a binary tree is mainly used. When the binary tree is used, a problem occurs, in that a new node is created on only any one side of the parse tree. Such a tree is called a skewed tree. The skewed tree reduces efficiency of a compile task. Therefore, it is important to generate an optimized parse tree to improve the efficiency of the compile task.

The method of the present disclosure may generate the new node while increasing a height of the parse tree when the parse tree is full and generate the new node while maintaining the height of the parse tree when the parse tree is not full. Accordingly, the parse tree generated by the present disclosure may be a balanced parse tree having an optimized height. Therefore, the compile task may be efficiently performed.

Figure 2:
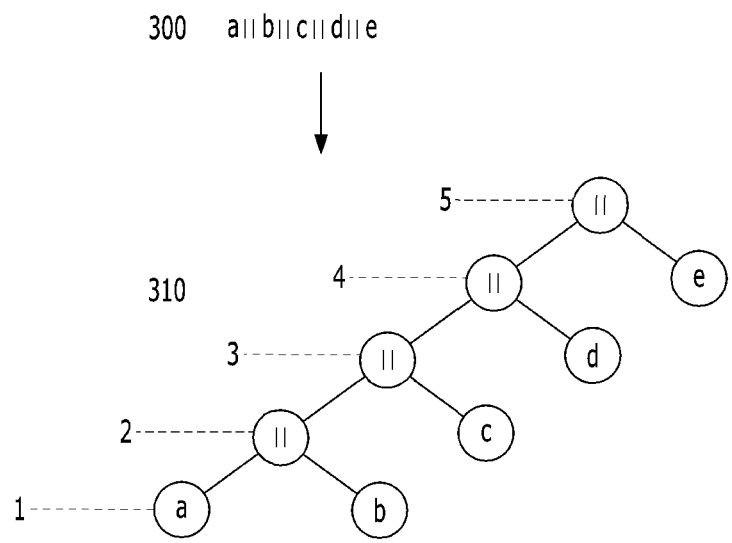
FIG. 2 is a diagram for describing a skewed tree.

FIG. 2 is a diagram for describing a skewed tree.

In FIG. 2, reference numeral 300 represents one example of the token stream. The token may mean a minimum unit having a grammatical semantic. The token may contain names or constants specified by a programmer in a generic form. Further, the token may include a keyword, an operator, a delimiter, etc., specified by a language designer in a special form.

The compiler usually uses a binary tree to represent a concatenated single operation that guarantees an associate law in the parsing process. In this case, a problem occurs, in that the tree may not be created in a balanced manner and is skewed. The tree is referred to as the skewed tree. The skewed tree has a problem in that the stack memory usage is increased and the compile time is increased.

The toke stream 300 illustrated in FIG. 2 includes nine tokes of 'a', '||', b', '||', 'c', '||', 'd', '||', and 'e'. The token stream may be converted into the parse tree of reference numeral 310 in the parsing process using the binary tree. The parse tree of reference numeral 310 is one example of the skewed tree.

Figure 3:
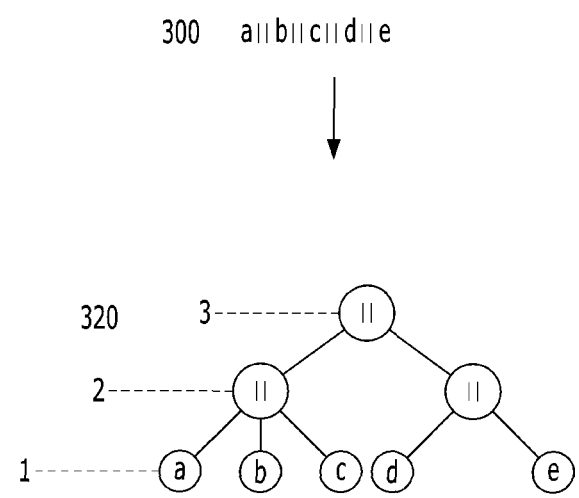
FIG. 3 is a diagram for describing a balanced parse tree having an optimized height according to an exemplary embodiment of the present disclosure.

FIG. 3 is a diagram for describing a balanced parse tree having an optimized height according to an exemplary embodiment of the present disclosure.

Reference numeral 320 of FIG. 3 represents the balanced parse tree having the optimized height, which is generated through a method for the same token stream 300 to generate the balanced parse tree of the present disclosure. It can be seen that the height of the parse tree is reduced as compared with the screwed tree of reference numeral 310.

According to the present disclosure, the height of the parse tree is optimized from n to ceil(log(n)) and the stack memory usage is reduced to n/ceil(log(n)). Further, according to the present disclosure, since the compiler module 1000 may operate in an n-ary operation instead of a binary operation, the compiler module 1000 may reduce function call overhead. An algorithm of the present disclosure may be applied to most systems without a large change.

Figure 4:
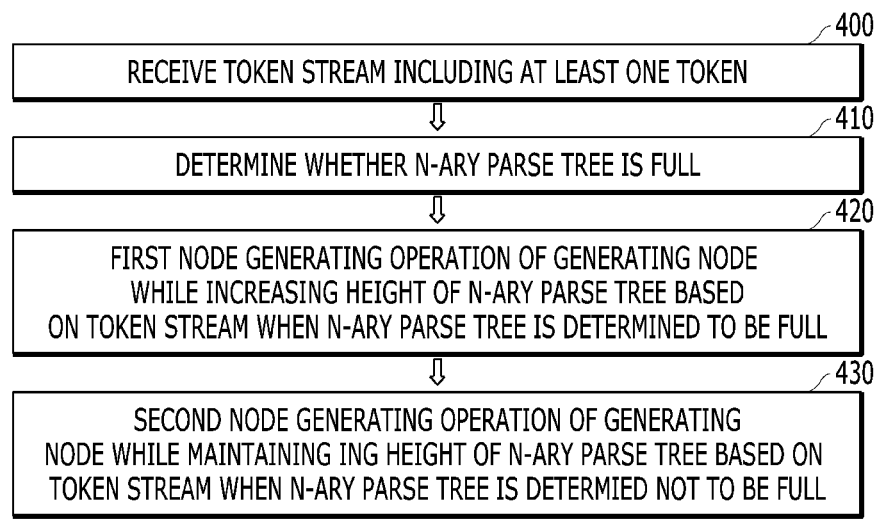
FIG. 4 is a diagram for describing a step for generating a balanced parse tree having an optimized height according to an exemplary embodiment of the present disclosure.

FIG. 4 is a diagram for describing a step for generating a balanced parse tree having an optimized height according to an exemplary embodiment of the present disclosure.

In the exemplary embodiment of the present disclosure, the method of creating the balanced parse tree according to the present disclosure may include receiving the toke stream including at least one token (400).

The syntax analyzer 120 receives the token stream to output the parse tree. That is, the syntax analyzer 120 analyzes the syntax of the token stream to generate the parse tree. The parse tree may mean a tree structurally showing an induction process.

When the same character string may be generated by two or more induction processes during the process of generating the parse tree, this is referred to as ambiguous grammar. In order to solve ambiguity, a method of giving a precedence or a method of giving associativity is used.

However, the ambiguity may not matter and in this case, an associate law is established. The associate law refers to a law in which when three numbers are added or multiplied, a result is not changed even by first adding or multiplying two preceding or succeeding numbers and then, adding one remaining number to the result or multiplying the result by one remaining number. For example, the semantic of '1+1+1' is not changed regardless of '(1+1)+1' or '1+(1+1)'. As another example, the semantic of 's; s; s;' is not changed regardless of (s; s); s' or 's (s; s)'.

In the exemplary embodiment of the present disclosure, the method of creating the balanced parse tree according to the present disclosure may be applied to the token stream for which the associate law is established. Therefore, the present disclosure may be applied to the case where the ambiguity does not matter. However, the present disclosure is not limited thereto.

In the exemplary embodiment of the present disclosure, the method of creating the balanced parse tree according to the present disclosure may include determining whether the n-ary parse tree is full (410).

In an exemplary embodiment of the present disclosure, the n-ary parse tree may represent that each node included in the parse tree may have n or fewer child nodes. The child node may be a node that is positioned while being subordinate to one node currently located in a tree structure. In other words, the child node may be a lower node connected to any one node.

To further describe the nodes included in the parse tree, a leaf node may be a node that does not have the child node and a top-tree node may be a top node of the tree structure. Since the top-tree node also has the child node, the top-tree node may be a parent node. A depth of the node may be the number of nodes included in a shortest path from the top-tree node to any one node. When the parse tree is full, the depths of all leaf nodes may be the same as each other. In other words, the depth of the leaf node may be the number of nodes included in the shortest path from the top-tree node to the leaf node.

In the exemplary embodiment of the present disclosure, the case where the parse tree is full may include two cases. The case where the parse tree is full may be a state where the parse tree may not generate the node without increasing the height. The method of creating the balanced parse tree according to the present disclosure may generate the node while increasing the height when the parse tree is full and generate the node without increasing the height of the parse tree when the parse tree is not full.

In the exemplary embodiment of the present disclosure, determining whether the parse tree is full may include determining the parse tree to be full when the number of nodes included in the parse tree is one.

More specifically, the parse tree may be determined to be full when the number of nodes included in the parse tree is one. In other words, this may be a case where the node is first generated by selecting the token from the token stream.

In the exemplary embodiment of the present disclosure, determining whether the parse tree is full may include determining whether each parent node included in the n-ary parse tree has n child nodes and determining the n-ary parse tree to be full when each parent node has n child nodes.

In the exemplary embodiment of the present disclosure, the parent node may be a node connected to an upper node of any one node. In other words, the parent node may mean a node having at least one child node. In this case, when each of all of the parent nodes has n child nodes, the tree structure may be balanceably generated without generating any deviation as illustrated in reference numeral 320.

Therefore, the method of creating the balanced parse tree according to the present disclosure increases the height of the parse tree when all of the parent nodes included in the parse tree have n child nodes, so that the parse tree may be generated in a balanced structure.

In the exemplary embodiment of the present disclosure, the method of creating the balanced parse tree according to the present disclosure may include a first node generating step (420) of generating the node while increasing the height of the parse tree based on the token stream when the n-ary parse tree is full.

More specifically, the method of creating the balanced parse tree of the present disclosure may generate the new node while increasing the height when the parse tree is full. In the present specification, this step may be referred to as the first node generating step (420). The case where the parse tree is full may include the two cases, however, but with respect to the two cases, the steps of generating the new node may be the same as each other as described below.

In the exemplary embodiment of the present disclosure, the first node generating step (420) may include generating the top-tree node based on the token stream and determining the top-tree node as the binary node.

The first node generating step may be generating the node when the parse tree is full. Being based on the received token stream may be to select the token to be included in the node to be generated next in the received token stream. For example, the new node may include at least one token included in the received token stream. Which token is to be included in the generated node may be performed by various methods.

In the first node generating step (420), a new node having the existing top-tree node as the child node may be generated. In other words, the new node may be a node having the existing top-tree node as the child node. Further, the new node may become the top-tree node of the parse tree. Therefore, the height of the parse tree may be increased.

In the exemplary embodiment of the present disclosure, the first node generating step (420) may include determining the generated top-tree node as the binary node.

In the first node generating step (420), a newly generated top-tree node may be determined as the binary node. Therefore, in this case, the top-tree node may have two child nodes.

In the exemplary embodiment of the present disclosure, the first node generating step (420) may include generating the child node connected to the top-tree node based on the token stream when the top-tree node is generated.

More specifically, the top-tree node is generated while the height of the parse tree is increased when the parse tree is full. Therefore, in order to balanceably generate the parse tree, the newly generated node needs to be generated as the child node connected to the top-tree node. Accordingly, when the new top-tree node is generated, the child node connected to the top-tree node is subsequently generated.

In the exemplary embodiment of the present disclosure, the method of creating the balanced parse tree according to the present disclosure may include a second node generating step (430) of generating the node while maintaining the height of the parse tree based on the token stream when the n-ary parse tree is not full.

More specifically, the method of creating the balanced parse tree according to the present disclosure may generate the node while maintaining the height of parse tree when the n-ary parse tree is not full. The new node is generated to be connected to nodes having less than n child nodes, and as a result, the parse tree may be generated in the balanced structure. Unlike the case where the parsing tree is full, in the case where the parse tree is not full, a method in which the new node is generated may slightly vary according to a type. This step may be referred to as the second node generating step (430) in the present specification and the second node generating step (430) may include the following step.

In the exemplary embodiment of the present disclosure, the second node generating step (430) may include determining the top-tree node as the n-ary node and generating the child node connected to the top-tree node based on the token stream when the top-tree node is the binary node and each parent node has n child nodes. Herein, the top-tree node may be excluded from the parent nodes.

In the first node generating step, the newly generated top-tree node is determined as the binary node. Therefore, the top-tree node may have two child nodes. However, when each of all parent nodes except for the top-tree node has n child nodes while the new node is added, the top-tree node may be determined as n-ary in order to generate the node while maintaining the height of the parse tree.

The case where each parent node except for the top-tree node has n child nodes indicates that the parse tree is balanceably generated. In this case, in order to generate the new node while maintaining the height of the parse tree, the new node needs to be generated as the child node connected to the top-tree node. Therefore, the second generation step may include the following step.

When each of all parent nodes except for the top-tree node which is the binary node has n child nodes, the top-tree node may be determined as the n-ary node in the second node generating step (430). In addition, the new node may be generated as the child node connected to the top-tree node determined as the n-ary node. Subsequently generated nodes are generated so that each of the lower nodes connected to the top-tree node has n nodes, and as a result, the parse tree may be balanceably generated.

In another exemplary embodiment of the present disclosure, the second node generating step may include a step of determining the top-tree node as the n-ary node and generating the child node connected to the top-tree node based on the token stream when the top-tree node is the binary node and has two leaf nodes.

More specifically, this case is a case where a total of three nodes exist in the parse tree. Therefore, in this case, the top-tree node as the binary node is determined as the n-ary node to have n child nodes. Therefore, in the second node generating step, the new node may be generated while maintaining the height of the parse tree.

In yet another exemplary embodiment of the present disclosure, the second node generating step (430) may include generating the child node connected to a last node when the top-tree node is the binary node and there is a parent node having less than n child nodes. Herein, the last node may be a node having a largest depth among nodes including less than n child nodes and having depths different from the depth of a lowest node.

More specifically, when the parse tree is not full, there may be a parent node having the top-tree node as the binary node and having less than n child nodes. In this case, in the second node generating step (430), the new node may be generated to be connected to the node having less than n child nodes.

The depth may be the number of nodes included in the shortest path from the top-tree node to any one node. The depth of the lowest node may be the number of nodes included in a shortest path from the top-tree node to the lowest node. The lowest node may be a node which exists in a lowest layer of the parse tree. Therefore, the height of the parse tree may be the same as the depth of the lowest node. Accordingly, a node having a depth different from the depth of the lowest node may be all nodes except for the lowest node. When the child node is generated in connection with the lowest node, the height of the parse tree is increased, and as a result, the lowest node is excluded from the last node.

In other words, when the top-tree node is the binary node and there is the parent node having less than n child nodes, the new node is generated so that each of all parent nodes has n child nodes in the second node generating step (430). For example, when the parse tree is extended from a left side to a right side and from a lower side to an upper side, the last node may be a leftmost node and a lower node. As described above, the lowest node is excluded from the last node. The reason is that the height of the parse tree is increased when the new node is connected to the lowest node. Accordingly, the last node may be selected from the nodes having the depth different from the height of the n-ary parse tree.

Further, the last node may be selected from nodes having less than n child nodes. As described above, the method of creating the balanced parse tree according to the present disclosure may be used for generating the parse tree so that each of all parent nodes has n child nodes.

There may be several nodes having less than n child nodes and having the depth different from the depth of the lowest node. Among the nodes, the node having the largest depth is determined as the last node. Accordingly, the last node may be specified as any one node. In the second node generating step (430), new nodes may be generated to be connected to the last node. Next, when the top-tree node is the n-ary, the second node generating step will be described.

In yet another exemplary embodiment of the present disclosure, the second node generating step (430) may include generating the child node connected to the last node when the top-tree node is the n-ary node.

More specifically, in the second node generating step (430), when the top-tree node is n-ary, it is determined whether the top-tree node is the n-ary node so as to generate the new nodes so that each of all parent nodes has n child nodes. In addition, when the top-tree node is n-ary, a new child node is generated, which is connected to the last node in the second node generating step (430).

Herein, the last node may be the node having the largest depth among the nodes including less than n child nodes and having the depths different from the depth of the lowest node as described above.

In the second node generating step (430), the steps are repeated to thereby allow the parse tree to be full. In this case, the first node generating step is performed and then, the second node generating step (430) is performed again. Such a process may be repeated until a final parse tree is generated.

Figure 5:
FIG. 5 is a diagram for describing a step for determining whether a parse tree is full according to an exemplary embodiment of the present disclosure.
Figure 5:
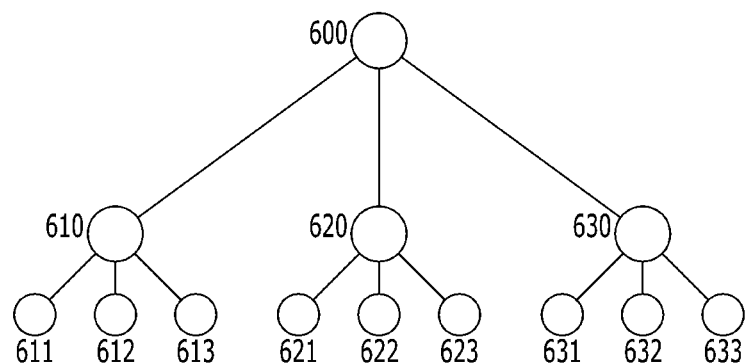

FIG. 5 is a diagram for describing a step for determining whether a n-ary parse tree is full according to an exemplary embodiment of the present disclosure.

In FIG. 5, an example of two cases in which the n-ary parse tree is determined to be full is illustrated.

First, FIG. 5A illustrates a case where the number of nodes included in the parse tree is 1 in the exemplary embodiment of the present disclosure. Since the parse tree includes one node 500, in this case, the parse tree is determined to be full. This may primarily correspond to a case where the parse tree starts to be generated. Even in this case, since the height of the parse tree needs to be increased, the n-ary parse tree may be determined to be full.

Second, FIG. 5B illustrates a case where each parent node has n child nodes in the exemplary embodiment of the present disclosure. The parse tree illustrated in FIG. 5B corresponds to a 3-ary parse tree. Therefore, the node included in the parse tree may have a maximum of three child nodes.

More specifically, in FIG. 5B, the parent node corresponds to reference numerals 600, 610, 620, and 630. Each of all of the parent nodes 600, 610, 620, and 630 includes three child nodes. That is, the parent node 600 includes child nodes 610, 620, and 630. The parent node 610 includes child nodes 611, 612, and 613 and the parent node 620 includes child nodes 621, 622, and 623. Last, the parent node 630 includes child nodes 631, 632, and 633.

Accordingly, the 3-ary parse tree illustrated in FIG. 5B may be determined to be full. In this case, the new node may not be generated while maintaining the height of the parse tree. Therefore, the parse tree may be determined to be full and the new node is generated while increasing the height of the parse tree.

Figure 6:
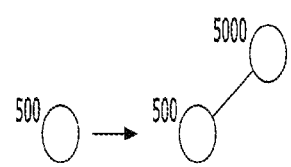
FIG. 6 is a diagram for describing a first node generating step according to the exemplary embodiment of the present disclosure.
Figure 6:
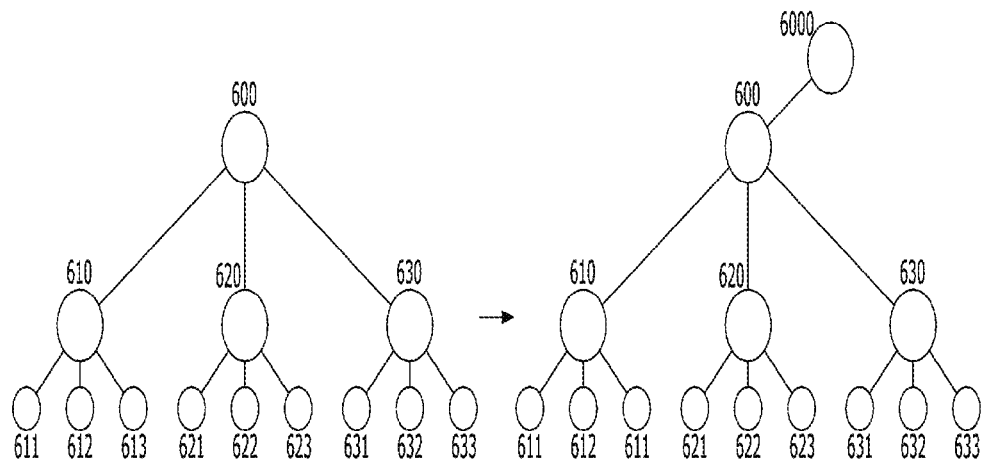

FIG. 6 is a diagram for describing a first node generating step (420) according to the exemplary embodiment of the present disclosure.

First, FIG. 6A illustrates a step of generating the new node when the number of nodes included in the parse tree is one.

More specifically, in the first generating step (420), a top-tree node 5000 having the node 500 included in the existing parse tree as the child node is generated. Therefore, the height of the parse tree increases to a total of 2. In addition, the top-tree node 5000 is determined as the binary node to include two child nodes.

Second, FIG. 6B illustrates a step of generating the new node when each parent node has n child nodes and the depths of the respective leaf nodes are the same as each other in the exemplary embodiment of the present disclosure. The parse tree illustrated in FIG. 6B corresponds to the 3-ary parse tree. Therefore, the node included in the parse tree may have a maximum of three child nodes.

A left figure of FIG. 6B is the same as a figure of FIG. 5B and illustrates a state where the 3-ray parse tree is full. In this case, in the first node generating step (420), a top-tree node 6000 having the existing top-tree node 600 as the child node may be generated. Therefore, the height of the 3-ary parse tree increases from 3 to 4. In addition, the top-tree node 6000 is determined as the binary node to include two child nodes.

Figure 7:
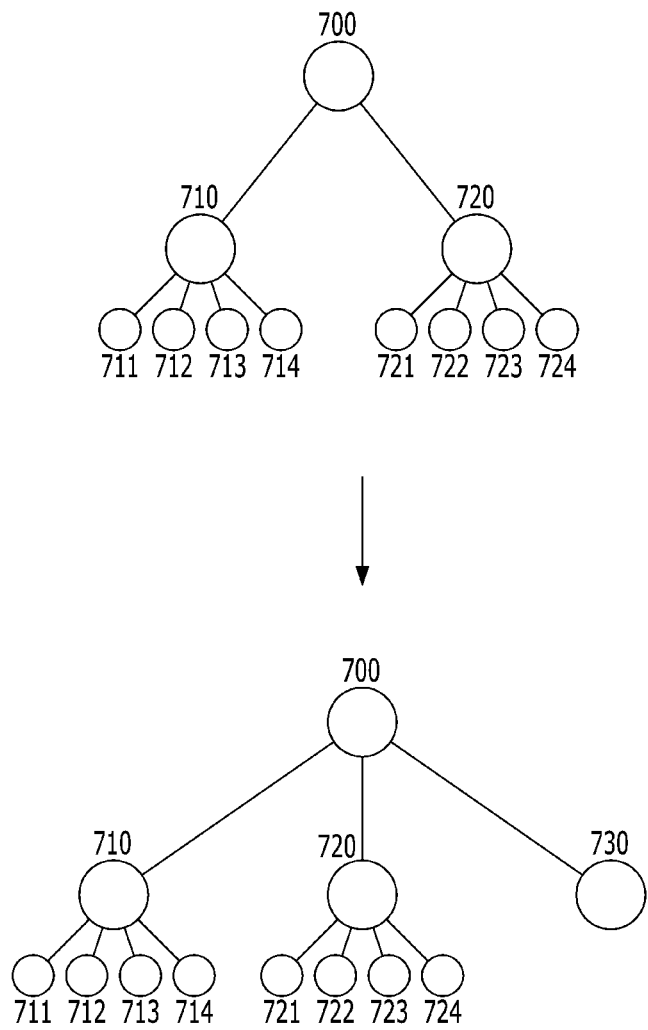
FIG. 7 is a diagram for describing a second node generating step when a top-tree node is a binary node and each parent node except for the top-tree node has n child nodes according to the exemplary embodiment of the present disclosure.

FIG. 7 is a diagram for describing the second node generating step (430) when the top-tree node is the binary node and each of the parent nodes except for the top-tree node has n child nodes according to the exemplary embodiment of the present disclosure.

The method of creating the balanced parse tree according to the present disclosure may include determining the top-tree node as the n-ary node and generating the child node connected to the top-tree node based on the token stream when the top-tree node is the binary node and each parent node except for the top-tree node has n child nodes.

The parse tree illustrated in FIG. 7 is a 4-ary parse tree. Therefore, the node included in the parse tree may have a maximum of four child nodes.

In the parse tree illustrated in FIG. 7, each of the parent nodes 710 and 720 have four child nodes, but the parent node 700 has two child nodes, and as a result, the parse tree illustrated in FIG. 7 is not full. Therefore, the new node may be generated by the second node generating step (430). Therefore, the new node may be generated while maintaining the height of the parse tree.

The top-tree node 700 corresponds to a binary node having two child nodes. In addition, each of the residual parent nodes 710 and 720 except for the top-tree node 700 has four child nodes. Therefore, in the second node generating step (430), the top-tree node 700 as the binary node may be determined as the 4-ary node and the child node 730 connected to the top-tree node 700 may be generated.

Figure 8:
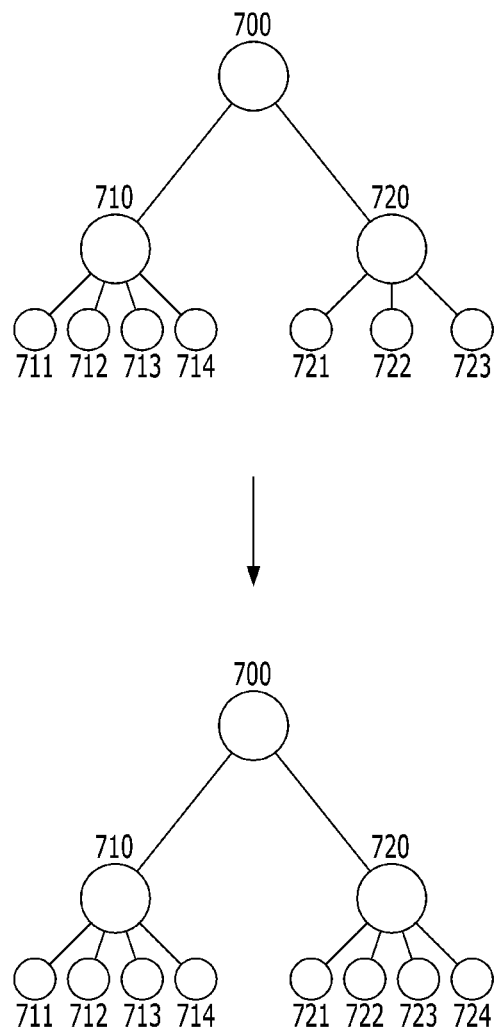
FIG. 8 is a diagram for describing the second node generating step when the top-tree node is the binary node and there is a parent node having less than n child nodes according to the exemplary embodiment of the present disclosure.

FIG. 8 is a diagram for describing the second node generating step (430) when the top-tree node is the binary node and there is the parent node having less than n child nodes according to the exemplary embodiment of the present disclosure.

The method of creating the balanced parse tree according to the present disclosure may include a step of generating the child node connected to the last node when the top-tree node is the binary node and there is the parent node having less than n child nodes. Herein, the last node may be a node having a largest depth among nodes including less than n child nodes and having depths different from the depth of a lowest node.

The parse tree illustrated in FIG. 8 is the 4-ary parse tree. Therefore, the node included in the parse tree may have a maximum of four child nodes.

In the parse tree illustrated in FIG. 8, each of the parent nodes 710 and 720 has four child nodes, but the parent node 700 has two child nodes, and as a result, the parse tree illustrated in FIG. 8 is not full. Therefore, the new node may be generated by the second node generating step (430).

Therefore, the new node may be generated while maintaining the height of the parse tree.

More specifically, the top-tree node corresponds to the binary node having two child nodes 710 and 720. In addition, the parent node 710 includes four child nodes, but the parent node 720 has three child nodes of reference numerals 721, 722, and 723. Therefore, in the parse tree of FIG. 8, the top-tree node is the binary node and the parent node has four or less child nodes.

Herein, the last node corresponds to reference numeral 720. More specifically, the height of the parse tree is 3 which is the number of nodes included in a path from the top-tree node 700 to the lowest nodes 711 to 723. Nodes having a depth different from the depth of the lowest node, that is, nodes having a depth which is not 3 correspond to reference numerals 700, 710, and 720. Among them, the nodes having 4 or less child nodes are reference numerals 700 and 720. Among them, a node having the largest depth is reference numeral 720. Therefore, the last node becomes reference numeral 720.

Therefore, the new node is generated as a child node 724 connected to reference numeral 720. Therefore, in the method of creating the balanced parse tree according to the present disclosure, the new node may be generated while maintaining the height of the parse tree.

Figure 9:
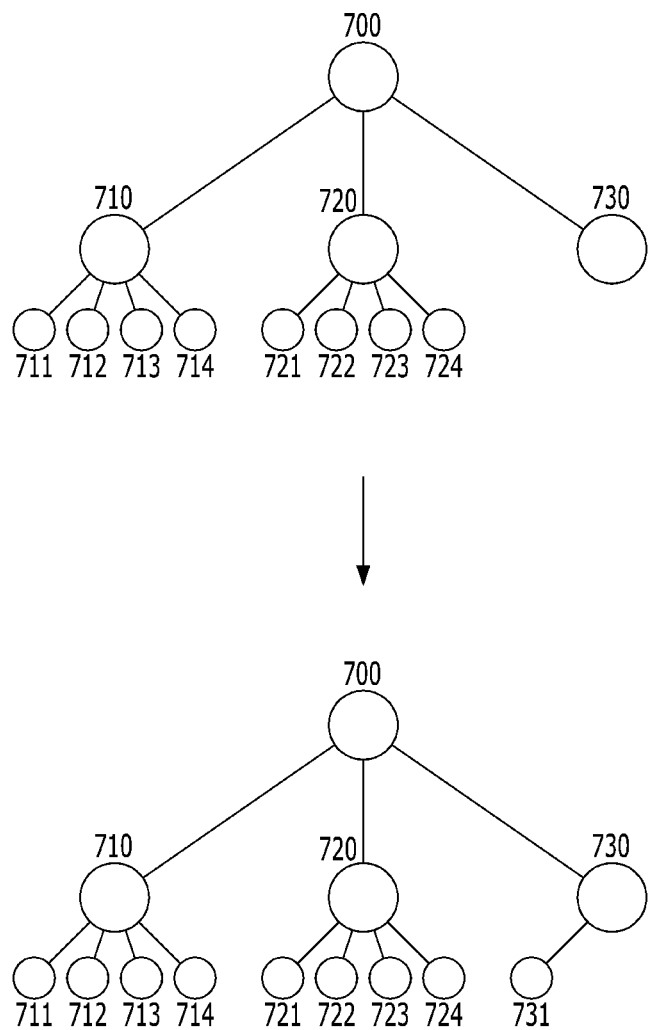
FIG. 9 is a diagram for describing the second node generating step when the top-tree node is an n-ary node according to the exemplary embodiment of the present disclosure.

FIG. 9 is a diagram for describing the second node generating step (430) when the top-tree node is the n-ary node and there is a parent node having less than n child nodes according to the exemplary embodiment of the present disclosure.

In the exemplary embodiment of the present disclosure, the second node generating step (430) may include generating the child node connected to the last node when the top-tree node is the n-ary node. Herein, the last node may be a node having the largest depth among the nodes including less than n child nodes and having the depths different from the depth of the lowest node as described above.

FIG. 9 illustrates a step of generating the child node connected to the last node when the parse tree is not full and the top-tree node is the n-ary node.

The parse tree illustrated in FIG. 9 is a 4-ary parse tree. Therefore, the node included in the parse tree may have a maximum of four child nodes.

In the parse tree illustrated in FIG. 9, each of the parent nodes 710 and 720 has four child nodes, but the child node 700 has three child nodes, and as a result, the parse tree illustrated in FIG. 9 is not full. Therefore, the new node may be generated by the second node generating step (430). Therefore, the new node may be generated while maintaining the height of the parse tree.

More specifically, the top-tree node corresponds to the 4-ary node having three child nodes 710, 720, and 730. Therefore, the parse tree of FIG. 9 shows the case where the top-tree node is the 4-ary node.

Herein, the last node corresponds to reference numeral 730. More specifically, the height of the parse tree is 3 which is the number of nodes included in a path from the top-tree node 700 to the lowest nodes 711 to 724. The nodes having the depth different from the depth of the lowest node, that is, nodes having the depth which is not 3 correspond to reference numerals 700, 710, 720, and 730. Among them, the nodes having 4 or less child nodes are reference numerals 700 and 730. Among them, the node having the largest depth is reference numeral 730. Therefore, the last node becomes reference numeral 730.

Therefore, the new node is generated as a child node 731 connected to reference numeral 730. Therefore, in the method of creating the balanced parse tree according to the present disclosure, the new node may be generated while maintaining the height of the parse tree.

It is proved that a speed is improved by 30% or more than in the existing parsing process through an experiment in the method of creating the balanced parse tree according to the present disclosure. The next thing is the source code used in the present experiment. It can be seen that a total time is reduced from 00:00:07.581848 to 00:00:05.199717 with respect to the same result.

```
================================================================
set timing on
set serveroutput on
declare
    Var varchar2(32767);
begin
    for i in 1.. 100000 loop
        var :=
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
```

```
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
'1' || '2' || '3' || '4' ||
'5' || '6' || '7' || '8' ||
'9' || '0' || '1' || '2' ||
'3' || '4' || '5' || '6' ||
'7' || '8' || '9' || '0' ||
 'X';
 end loop;
 dbms_output.put_line (var);
 end;
/
<original version>
123456789012345678901234567890123456789012345678901234567890
123456789012345678901234567890123456789012345678901234567890
123456789012345678901234567890123456789012345678901234567890X
PSM completed
Total elapsed time 00:00:07.581848
<optimized version>
123456789012345678901234567890123456789012345678901234567890
123456789012345678901234567890123456789012345678901234567890
123456789012345678901234567890123456789012345678901234567890X
PSM completed
Total elapsed time 00:00:05.199717
```

Figure 10:
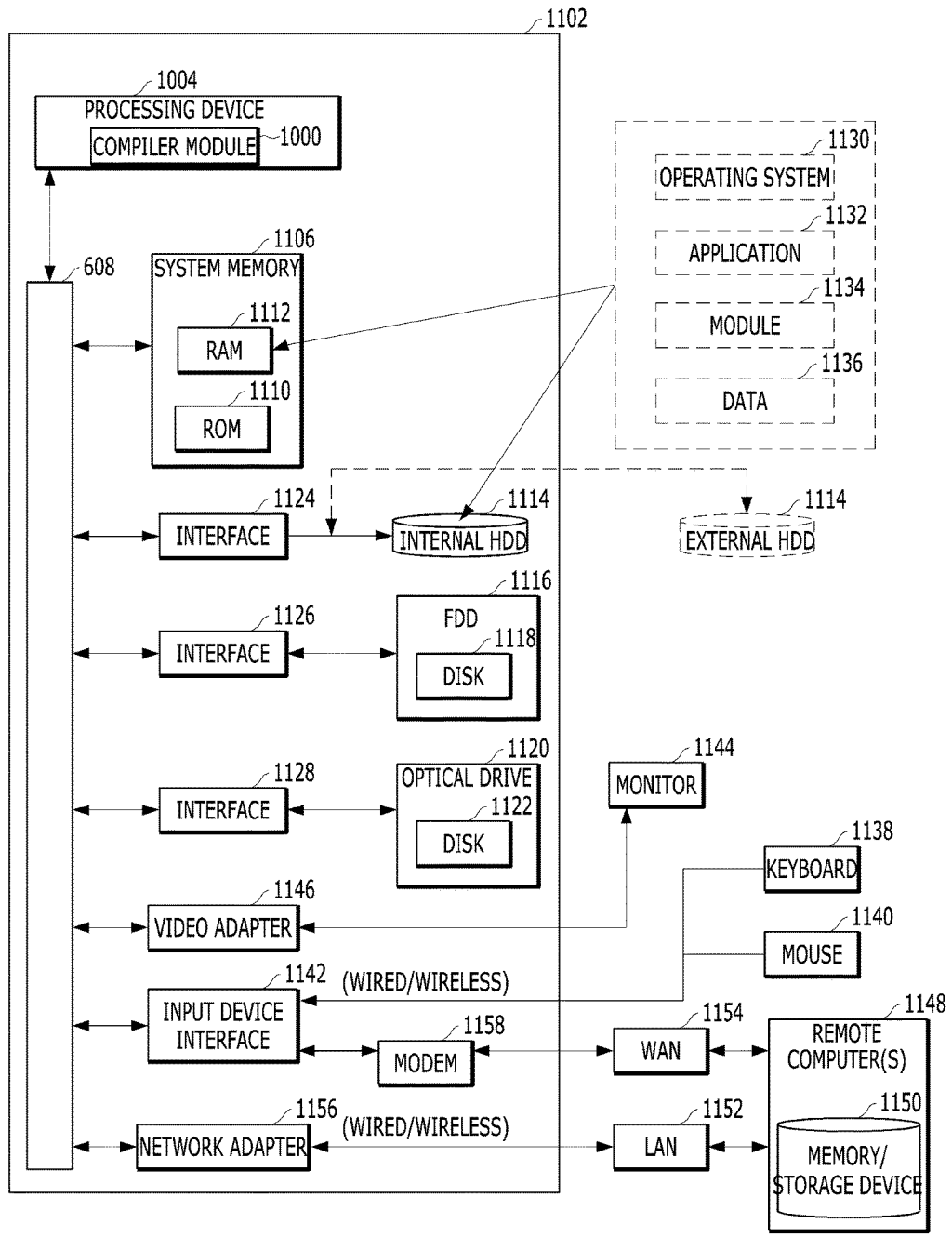
FIG. 10 is a block diagram of an exemplary computing device for implementing a method of creating a balanced parse tree according to an exemplary embodiment of the present disclosure.

FIG. 10 is a block diagram of an exemplary computing device for implementing a method of creating a balanced parse tree according to an exemplary embodiment of the present disclosure.

The present disclosure has generally been described above in association features which may be executed on computers or processors in one or more servers, but it will be well appreciated by those skilled in the art that the present disclosure can be implemented in a combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media.

The computer readable storage media include volatile and non-volatile media, temporary or non-temporary media, movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto. The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, transmitting/receiving (communication) media include wired media such as a wired network or a direct-wired connection and wireless media such as acoustic, RF, infrared and other wireless media. A combination of any media among the aforementioned media is also included in a range of the computer readable transmission media.

In FIG. 10, an exemplary environment 1100 that implements various aspects of the present disclosure including a computing device 1102 for implementing the method of creating the balanced parse tree according to the present disclosure is shown and the computing device 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The processing device 1104 may include the compiler module 1000 for implementing the method of creating the balanced parse tree according to the present disclosure. However, the present disclosure is not limited thereto.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computing device 1102 at a time such as in-starting. The RAM 1112 may also include a high-speed RAM including a static RAM for caching data, and the like.

The computing device 1102 also includes an internal hard disk drive (HDD) 1114 (for example, EIDE and SATA)—the internal hard disk drive (HDD) 1114 may also be configured for an external purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable storage media associated therewith provide non-volatile storage of the data, the data structure, the computer executable command, and others. In the case of the computing device 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computing device 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computing device 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computing device 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and the like and all of them may be connected to a worldwide computer network, for example, the Internet.

When the computing device 1102 is used in the LAN networking environment, the computing device 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computing device 1102 is used in the WAN networking environment, the computing device 1102 may include a modem 1158 or is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computing device 1102 or some thereof may be stored in the remote memory/storage device 1150. It will be well known that illustrated network connection is exemplary and it will be well appreciated that other means configuring a communication link among computers may be used.

The computing device 1102 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology for such a device, for example, a cellular phone which enables the computer to transmit and receive data indoors or outdoors, that is, anywhere in a communication range of a base station. The Wi-Fi network uses a wireless technology called IEEE 802.6(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 6 Mbps (802.6a) or 54 Mbps (802.6b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" include various other media that may store and posses command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

What is claimed is:

1. A computer program stored in a non-transitory computer readable storage medium, which includes encoded commands, wherein when the computer program is executed by one or more processors of a computer system, the computer program allows the one or more processors to perform steps for generating a balanced parse tree having an optimized height, the steps comprising:
   receiving a token stream including at least one token;
   determining whether an n-ary parse tree is full, wherein the n-ary parse tree includes at least one node and the at least one node each includes n or less child nodes;
   a first node generating operation of generating a node while increasing a height of the parse tree based on the token stream when the n-ary parse tree is full; and
   a second node generating operation of generating the node while maintaining the height of the parse tree based on the token stream when the n-ary parse tree is not full;
   wherein the first node generating operation includes generating a top-tree node included in the n-ary parse tree based on the token stream, and determining the top-tree node as a binary node.

2. The computer program stored in the non-transitory computer readable storage medium of claim 1, wherein the determining of whether the n-ary parse tree is full includes
   determining whether the number of nodes included in the n-ary parse tree is one, and
   determining the n-ary parse tree to be full when the number of nodes included in the n-ary parse tree is one.

3. The computer program stored in the non-transitory computer readable storage medium of claim 1, wherein the determining of whether the n-ary parse tree is full includes
   determining whether each parent node included in the n-ary parse tree has n child nodes, and
   determining the n-ary parse tree to be full when each parent node has n child nodes.

4. The computer program stored in the non-transitory computer readable storage medium of claim 1, wherein the first node generating operation further includes generating a child node connected to the top-tree node based on the token stream when the top-tree node is generated.

5. The computer program stored in non-transitory computer readable storage medium of claim 1, wherein the second node generating operation includes determining a top-tree node as a n-ary node and generating the child node connected to the top-tree node based on the token stream when the top-tree node is a binary node and each of the parent nodes has n child nodes wherein the top-tree node is excluded from the parent nodes.

6. The computer program stored in the non-transitory computer readable storage medium of claim 1, wherein the second node generating operation includes determining a top-tree node as a n-ary node and generating the child node connected to the top-tree node based on the token stream when the top-tree node is a binary node and has two leaf nodes.

7. The computer program stored in the non-transitory computer readable storage medium of claim 1, wherein the second node generating operation includes generating a child node connected to a last node when a top-tree node is a binary node and there is a parent node having less than n child nodes, and
the last node is a node having a largest depth among nodes including the less than n child nodes and having depths different from the depth of a lowest node.

8. The computer program stored in the non-transitory computer readable storage medium of claim 1, wherein the second node generating operation includes generating the child node connected to a last node when a top-tree node is the n-ary node, and
the last node is a node having the largest depth among nodes including the less than n child nodes and having depths different from the depth of a lowest node.

9. A method of creating a balanced parse tree having an optimized height, which is performed by one or more processors of a computing device, the method comprising:
receiving a token stream including at least one token;
determining whether an n-ary parse tree is full, wherein the n-ary parse tree includes at least one node and the node includes n or less child nodes;
a first node generating operation of generating a node while increasing a height of the parse tree based on the token stream when the n-ary parse tree is full; and
a second node generating operation of generating the node while maintaining the height of the parse tree based on the token stream when the n-ary parse tree is not full;
wherein the first node generating operation includes venerating a top-tree node included in the n-ary parse tree based on the token stream, and determining the top-tree node as a binary node.

10. A computing device comprising:
one or more processors; and
a memory storing commands executable in the one or more processors,
wherein the one or more processors perform
receiving a token stream including at least one token,
determining whether an n-ary parse tree is full, wherein the n-ary parse tree includes at least one node and the node includes n or less child nodes,
a first node generating operation of generating a node while increasing a height of the parse tree based on the token stream when the n-ary parse tree is full, and
a second node generating operation of generating the node while increasing the height of the parse tree based on the token stream when the n-ary parse tree is not full;
wherein the first node generating operation includes generating a top-tree node included in the n-ary parse tree based on the token stream, and determining the top-tree node as a binary node.

* * * * *